US008701651B2

(12) United States Patent
King et al.

(10) Patent No.: US 8,701,651 B2
(45) Date of Patent: Apr. 22, 2014

(54) TRIVET

(75) Inventors: Scott King, Frenchs Forest (AU); Lyndon Craig, Balmain (AU); Lars Erikson, Djursholm (SE); Carlo Rossi, Norwood (AU); Stephen Wise, Fulham Gardens (AU)

(73) Assignee: Aktiebolaget Electrolux, Stockholm (SE)

( * ) Notice: Subject to any disclaimer, the term of this patent is extended or adjusted under 35 U.S.C. 154(b) by 293 days.

(21) Appl. No.: 12/935,999

(22) PCT Filed: Apr. 2, 2009

(86) PCT No.: PCT/EP2009/002413
§ 371 (c)(1),
(2), (4) Date: Dec. 20, 2010

(87) PCT Pub. No.: WO2009/121598
PCT Pub. Date: Oct. 8, 2009

(65) Prior Publication Data
US 2011/0095146 A1 Apr. 28, 2011

(30) Foreign Application Priority Data

Apr. 4, 2008 (AU) ................................ 2008901632

(51) Int. Cl.
*A47J 36/34* (2006.01)
(52) U.S. Cl.
CPC ...................................... *A47J 36/34* (2013.01)
USPC ........ 126/153; 126/152 R; 248/157; 248/150; 248/346.07; 248/346.3
(58) Field of Classification Search
USPC ......... 446/106, 118, 120–122; 52/233, 311.2, 52/676, 686; 126/39 J, 39 R, 218, 211, 126/214 A, 61, 38, 66, 67, 39 G, 540, 152 R, 126/153–154, 167; 312/111; 248/149–151, 248/176.2, 346.3, 346.07, 188.4, 346.05, 248/157, 558, 188.8–188.9; D7/388, 387, D7/408; 211/85; 108/51.11, 54.1, 56.1, 108/56.3, 64, 57.17, 57.19; 403/346–347, 403/400

See application file for complete search history.

(56) References Cited

U.S. PATENT DOCUMENTS

| 475,980 | A | * | 5/1892 | Holt | ............................... | 108/156 |
| 1,532,912 | A | * | 4/1925 | McMahan | ..................... | 248/167 |

(Continued)

FOREIGN PATENT DOCUMENTS

| GB | 2427122 | 12/2006 |
| JP | 10238788 | 9/1998 |

(Continued)

OTHER PUBLICATIONS

International Search Report for PCT/EP2009/002413, dated Aug. 18, 2009, 3 pages.

*Primary Examiner* — Terrell McKinnon
*Assistant Examiner* — Ingrid M Weinhold
(74) *Attorney, Agent, or Firm* — Pearne & Gordon LLP (57) ABSTRACT

A modular trivet arrangement includes trivet members including a first bar, a first footing at a first end of the first bar, a second footing at the second end of the first bar, and one or more transverse bars, each transverse bar being transverse to the first bar and intersecting therewith, the second bar having a third footing at a first end of the second bar and a fourth footing at the second end of the second bar. The intersection between the first and second bars can support a cooking utensil. The modular trivet members include one or more engaging slots adapted to enable engagement with a cooperating modular trivet member.

11 Claims, 8 Drawing Sheets

(56) References Cited

U.S. PATENT DOCUMENTS

| | | | | |
|---|---|---|---|---|
| 1,886,112 A | * | 11/1932 | Luarde | 248/188.4 |
| 2,594,215 A | | 4/1952 | Resek | |
| 3,225,938 A | * | 12/1965 | Von Bromssen | 211/85 |
| 3,342,146 A | * | 9/1967 | Lessheim | 108/53.3 |
| 3,897,724 A | * | 8/1975 | McDonald | 100/34 |
| 3,927,624 A | * | 12/1975 | Hewson | 108/56.1 |
| 3,967,803 A | * | 7/1976 | Kienlen et al. | 248/152 |
| 4,178,844 A | * | 12/1979 | Ward et al. | 99/449 |
| 4,292,900 A | * | 10/1981 | Bula | 108/57.31 |
| D263,919 S | * | 4/1982 | Anderson, Jr. | D7/388 |
| 4,350,099 A | * | 9/1982 | Persson | 108/56.1 |
| D267,386 S | * | 12/1982 | Kneale, III | D7/388 |
| 4,725,028 A | * | 2/1988 | Conradt | 248/150 |
| 5,092,252 A | * | 3/1992 | Gillhart | 108/55.1 |
| D339,265 S | * | 9/1993 | Claesson | D7/388 |
| 5,487,345 A | * | 1/1996 | Winebarger et al. | 108/51.3 |
| 5,492,069 A | * | 2/1996 | Alexander et al. | 108/56.3 |
| 5,507,118 A | * | 4/1996 | Brown | 49/61 |
| 5,507,398 A | * | 4/1996 | Miller | 211/153 |
| 5,846,114 A | * | 12/1998 | Frandsen, II | 446/106 |
| D458,803 S | * | 6/2002 | Becker et al. | D7/408 |
| D488,954 S | * | 4/2004 | Lara | D7/388 |
| 7,048,243 B1 | * | 5/2006 | Steinman | 248/346.01 |
| D544,748 S | * | 6/2007 | Johansson | D7/388 |
| 7,334,529 B1 | * | 2/2008 | Liao et al. | 108/57.26 |
| 7,735,429 B2 | * | 6/2010 | Meissen | 108/54.1 |
| 7,938,070 B2 | * | 5/2011 | Shea | 108/56.3 |
| D666,480 S | * | 9/2012 | Peacock et al. | D8/380 |
| 2004/0226490 A1 | * | 11/2004 | Polumbaum | 108/56.1 |
| 2005/0103966 A1 | * | 5/2005 | Kim | 248/346.05 |
| 2007/0028814 A1 | * | 2/2007 | Swistak et al. | 108/51.11 |

FOREIGN PATENT DOCUMENTS

| | | |
|---|---|---|
| JP | 2006242534 | 9/2006 |
| WO | 2004003435 | 1/2004 |
| WO | 2008068585 | 6/2008 |
| WO | 2009127935 | 10/2009 |

* cited by examiner

TRIVET

FIELD OF THE INVENTION

This invention relates to a trivet and to modular trivet elements.

BACKGROUND OF THE INVENTION

It is common for stove manufacturers to provide a number of different models, and this can require a different trivet configuration for different models. This creates a requirement for an inventory of differing trivet assemblies.

Any reference herein to known prior art does not, unless the contrary indication appears, constitute an admission that such prior art is commonly known by those skilled in the art to which the invention relates, at the priority date of this application.

SUMMARY OF THE INVENTION

The invention provides a modular trivet system which provides a number of discrete modular trivet elements which can be assembled in different configurations.

In one embodiment, the invention provides a modular trivet member including a first bar, a first footing at a first end of the first bar, a second footing at the second end of the first bar, and one or more transverse bars, each transverse bar being transverse to the first bar and having a third footing at a first end of the second bar and a fourth footing at the second end of the second bar.

The footing can include a foot pad.

One or more of the foot pads can be adjustable in height.

The footings can be of sufficient height to support the intersection of the first and second bars at a predetermined height above a gas burner.

The first and second bars can be formed integrally.

The first bar can include one or more transverse slots adapted to receive a second modular trivet member.

The transverse slot can open on the upper side of the first bar.

An enlarged section or pod can be formed on the first bar.

The pod can have a cylindrical section.

The pod can have an axis transverse to the first and second bars.

The transverse slot can be formed in the pod.

The slot can open on the lower side of the first bar.

Each end of the first and second bars can include a threaded projection.

The footing can be formed of a tube.

The adjustable pad can be adjusted by a screw cooperating with the threaded projection.

The end of the bar can include a projecting rim extending beyond the periphery of the tube.

The numbering convention used in the drawings is that the digits in front of the full stop or period indicate the drawing number, and the digits after the full stop or period are the element reference numbers. Where possible, the same element reference number is used in different drawings to indicate corresponding elements.

BRIEF DESCRIPTION OF THE DRAWINGS

An embodiment or embodiments of the present invention will now be described, by way of example only, with reference to the accompanying drawings, in which.

DETAILED DESCRIPTION OF THE EMBODIMENT OR EMBODIMENTS

Figure 1:
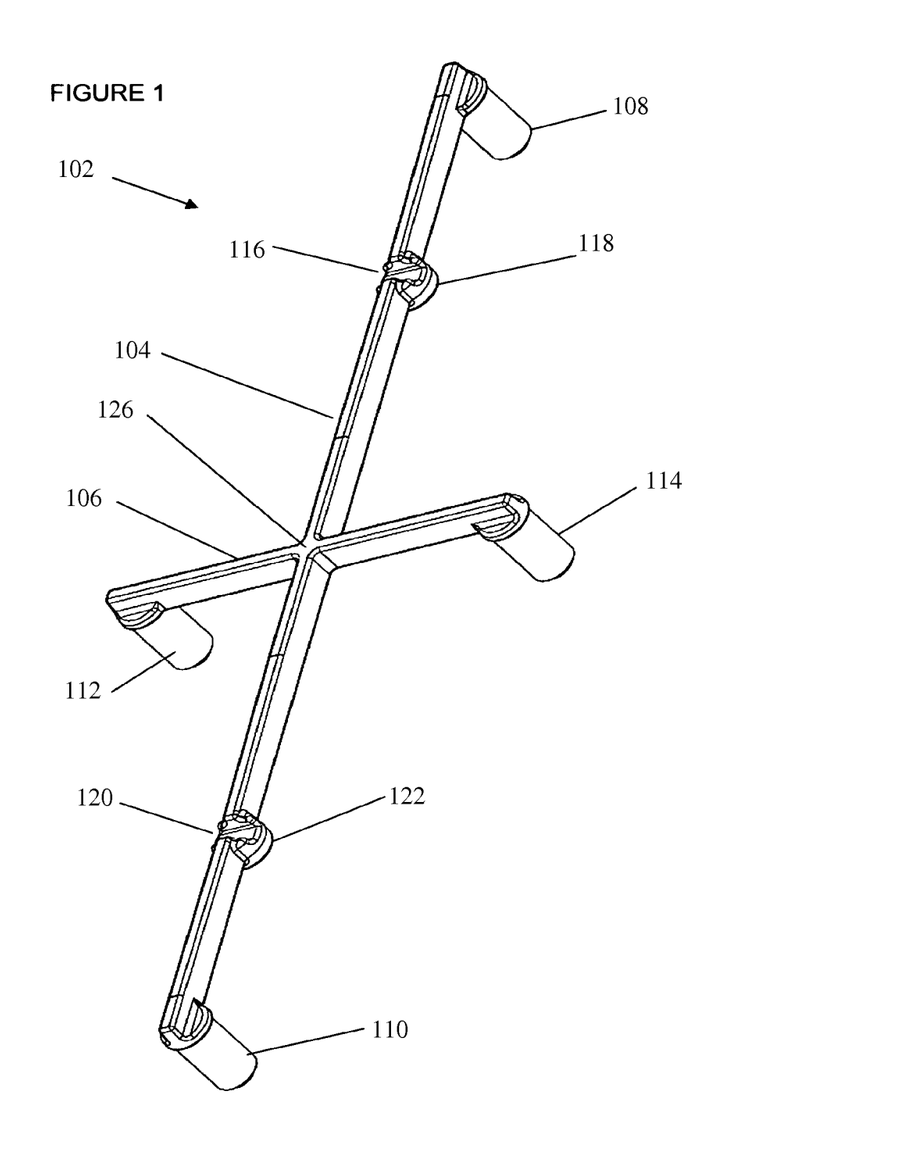
FIG. 1 is a perspective view of an section of a modular trivet arrangement according to an embodiment of the invention.

FIG. 1 illustrates a modular trivet member 102 in the form of a cross with a main support 104 having a cross-section in the form of a substantially rectangular bar, and a cross support 106 with a similar cross-section. At the ends of the main support there are feet 108, 110, and the cross support has similar feet 112, 114. These feet make the modular trivet member self-supporting. The feet provide good stability for the trivet member as the feet are located at the ends of their associated bars, so loads are applied inboard of the feet. The intersection 126 between the main bar 104 and the cross bar 106 forms the center of a utensil support. Thus, a pot can be stood on the junction which, in use, is centrally located on a gas burner.

The main support 104 carries upwardly facing auxiliary cross member recesses or slots 116, 120 each adapted to receive a further cross member. The auxiliary cross member recess includes reinforcing blocks 118, 122.

Figure 2:
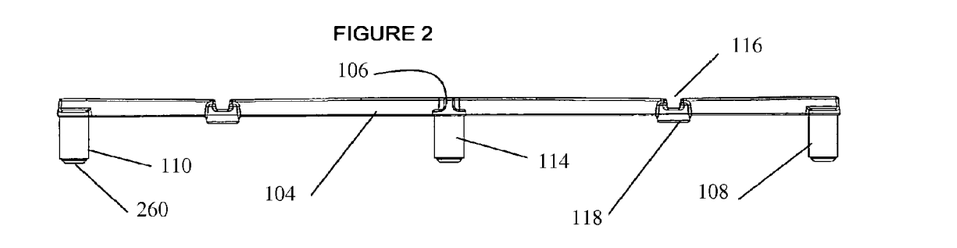
FIG. 2 is a side view of the member of FIG. 1.

FIG. 2 is a side view of the trivet member of FIG. 1. The main bar 104 has feet 108, 110 at either end. The foot 114 of cross bar 106 is also shown. Each foot terminates in a pad such as 260 which can be rubber. FIG. 2 also shows the upwardly facing auxiliary cross member slot 116 and the reinforcing block 118.

Figure 3:
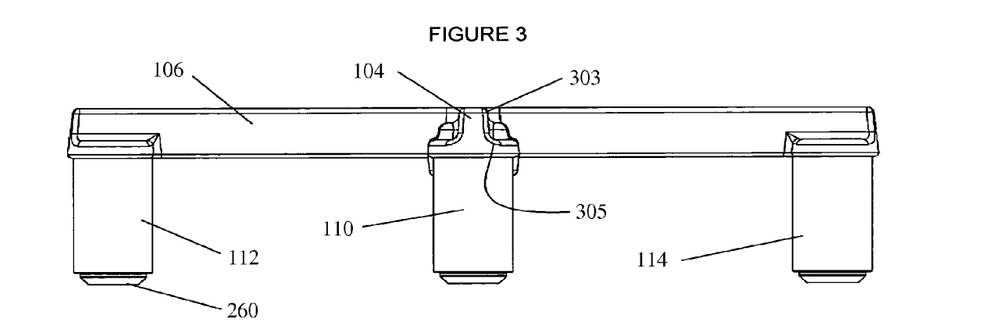
FIG. 3 is an end view of the member of FIG. 1.

FIG. 3 is an end view of the trivet member of FIG. 1. The main bar 104 is seen end on, and the cross bar 106 has feet 112, 114. The edges of the main bar 104 and cross bar 106 are rounded as shown at 303, and the junction between the main bar and the cross bar are also curved as shown at 305. FIG. 3 also shows foot 110 and pads 260.

Figure 4:
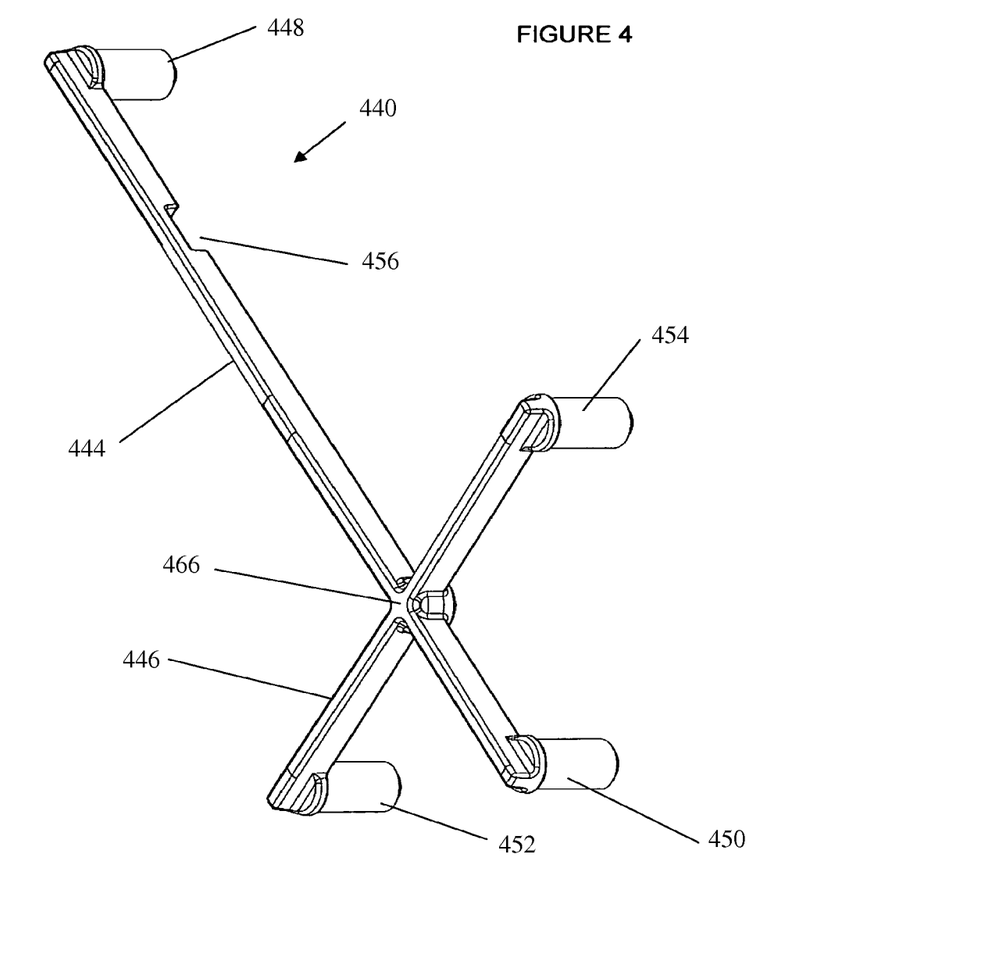
FIG. 4 is a perspective view of an auxiliary trivet member.

FIG. 4 shows a trivet member 440 according to a second embodiment of the invention having a main bar 444 and a cross bar 446 intersecting at 466. The main bar terminates in footings 448, 450, and the cross bar terminates in footings 452, 454. The four feet make this trivet member self-supporting. The main bar includes a downwardly facing slot 456 adapted to engage an upwardly facing slot of another trivet member having an upwardly facing slot according to another embodiment of the invention, such as slots 116, 120 of the trivet member shown in FIG. 1. Thus the trivet element 440 can be connected to trivet element 102 by interlocking the slots 456 and slot 116.

Figure 5:
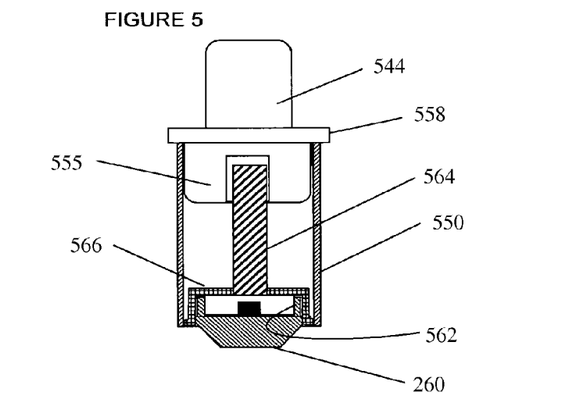
FIG. 5 schematically illustrates a section of a footing.

FIG. 5 is a section view of a footing according to an embodiment of the invention. The end of the bar 544 has a threaded projection 555 and a projecting rim 558. The bar can be made of cast iron. The footing includes a tubular shell 550 which is preferably of stainless steel, but other suitable materials, including for example, aluminum or glass, can be used. A foot pad 260 of rubber or nylon or other suitable material is attached to the threaded projection 555 by screw 564. A cap 566 of aluminum encloses the upper side of the foot pad 260. Silicone sealant can be applied to the cap before insertion during assembly. FIG. 5 also shows a portion 562 of foot pad 260 which circumscribes a head of screw 564.

Figure 6:
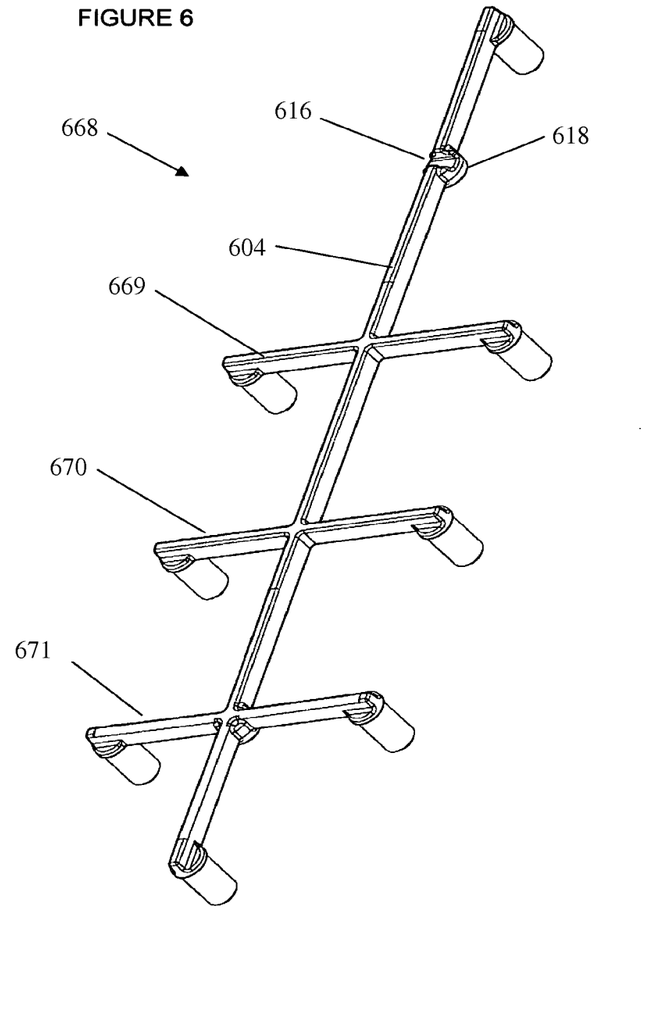
FIG. 6 shows a further modular trivet member according top an embodiment of the invention.

FIG. 6 shows a trivet member 668 according to a further embodiment of the invention. A main member 604 terminates in footings at either end and carries three cross members 669, 670, 671. This trivet member has eight feet and is self-supporting. FIG. 6 also shows an upwardly facing auxiliary cross member slot 616 and reinforcing block 618. Each of the slot 616 and the block 618 can be similar or identical to the slot 116 and the block 118 as shown in FIG. 1.

Figure 7:
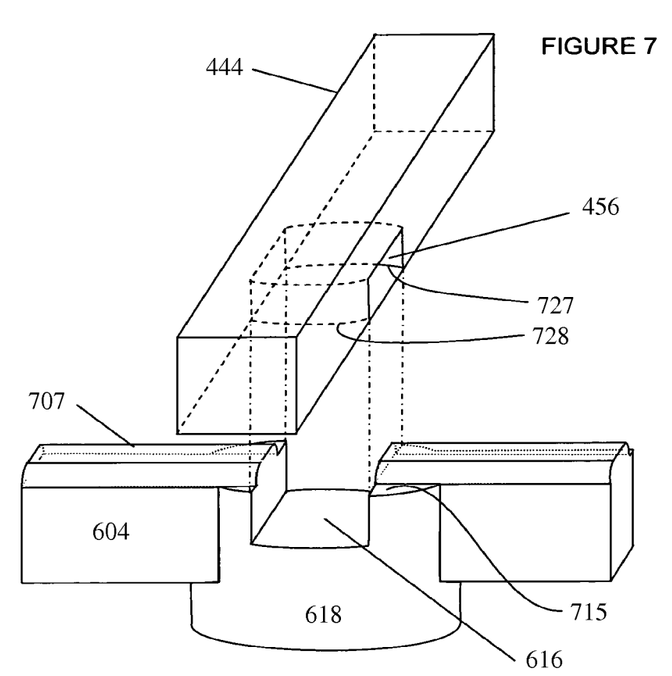
FIG. 7 shows detail of an exploded partial view of a connection between a pair of trivet elements according to an embodiment of the invention.

FIG. 7 illustrates an exploded partial view showing detail of a connection between a pair of modular trivet elements according to an embodiment of the invention. A first bar 604 has a transverse cylindrically expanded portion 618 through which a slot 616 passes. The slot 616 is mutually transverse to the axis of the cylinder and to the bar 604. The bar also has an upper transition ending in plateau 707. Preferably the transition is curved.

An intersecting second bar 444 has a transverse slot 456 adapted to engage with the bar 604 at the cylindrical expansion 618. The walls 727, 728 of the slot 456 can be curved to conform to the walls of the cylinder 618. In the engaged state, the walls of the slot 456 overlap the walls of the cylinder 618, and the walls of slot 616 overlap the sides of the bar 444 to stabilize the joint. The walls of the cylinder at 715 which are sectioned by the slot also provide stability against angular movement of the two modular members. The side walls of the slot 616 can provide additional stability when the bars 604 and 444 are engaged. The tolerance between the slots 616 and 456 and their mating walls are such as to enable ready assembly and stable connection while avoiding problems due to possible different thermal expansions.

In practice, the edges of the bars and slots can be rounded.

Figure 8:
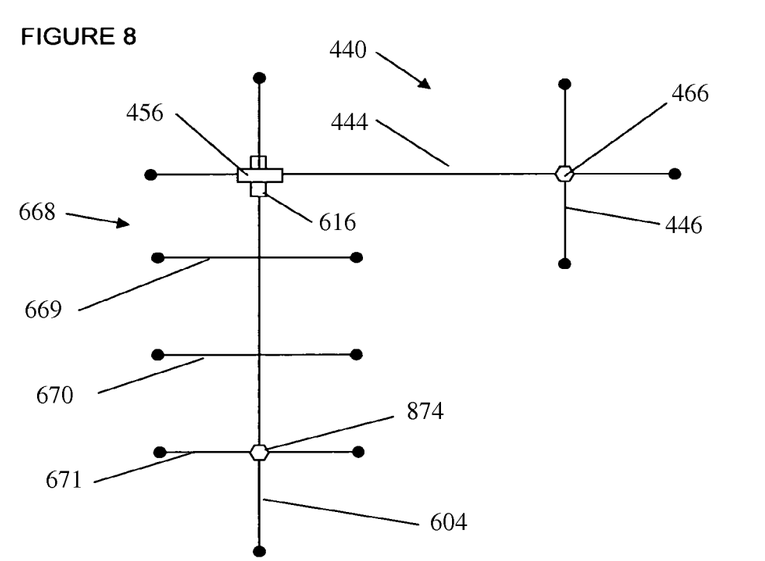
FIG. 8 schematically illustrates a first assembly of modular elements according to an embodiment of the invention.

FIG. 8 illustrates schematically an assembly of two trivet members according to an embodiment of the invention. A first trivet member 668 corresponds with the trivet member 668 illustrated in FIG. 6, and trivet member 440 corresponds to the trivet member 440 illustrated in FIG. 4. The first trivet member 668 includes an upward facing slot at 616, and trivet member 440 includes a downward facing slot 456. The slots 616 and 456 are engaged by placing the trivet member 440 over the trivet member 668 so that the slots engage. This arrangement can support utensils at at least one intersection such as 456, 466, 874. FIG. 8 also shows the main bar 444 and cross bar 446 of trivet member 440. Trivet member 668 includes main bar 604 and three cross members 669, 670, 671.

Figure 9:
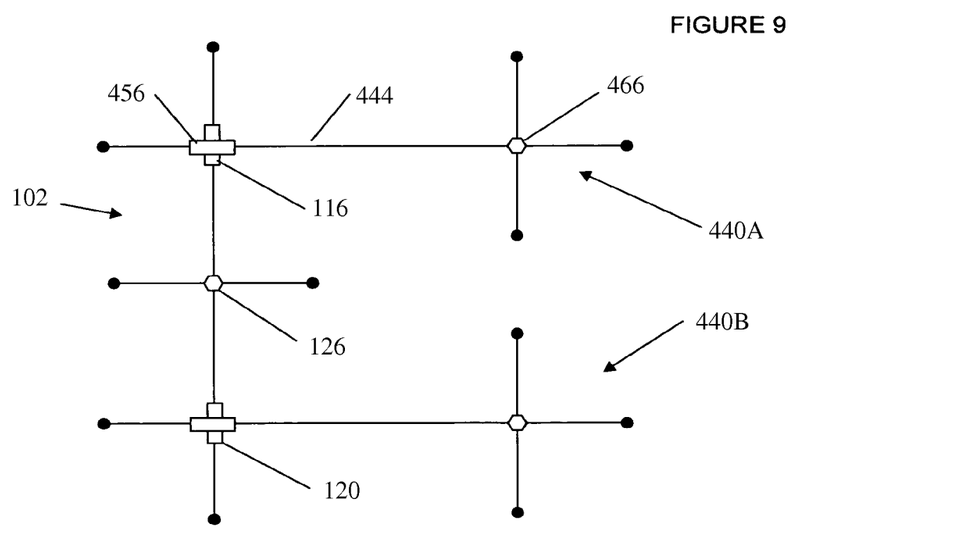
FIG. 9 schematically illustrates a second assembly of modular elements according to an embodiment of the invention.

FIG. 9 illustrates schematically an assembly of three trivet members according to another embodiment of the invention. A first trivet member 102, corresponding to the trivet member 102 of FIG. 1 is connected with second and third trivet members 440A, 440B, each corresponding to the trivet member 440 of FIG. 4. Second trivet member 440A includes main bar 444, downwardly facing slot 456, and intersection 466. Similar structures are included on the third trivet member 440B. First trivet member 102 includes upwardly facing auxiliary cross member slots 116, 120 and intersection 126.

Figure 10:
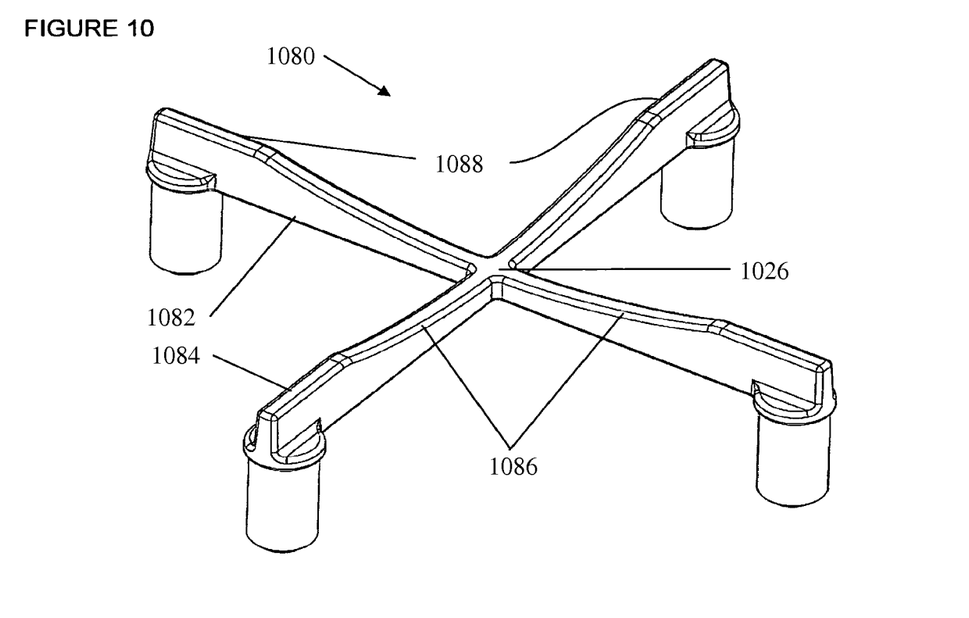
FIG. 10 illustrates a further modular trivet member according to a further embodiment of the invention.

FIG. 10 illustrates a further modular trivet member 1080 according to a further embodiment of the invention. Trivet member 1080 includes an intersection 1026 from which bars such as typical bar 1082 extend away from the intersection 1026. In one example, the bars 1082 can extend radially from the intersection 1026 and can be evenly spaced around the intersection 1026. Each bar 1082 can include a substantially flat area 1084 at an end of the bar opposite from the end of the bar connected to the intersection 1026. In one example, each bar 1082 can include a portion of the bar 1086 having a lower elevation than the substantially flat area 1084. Portions of the bars 1082 can include chamfers or rounded edges 1088.

Figure 11:
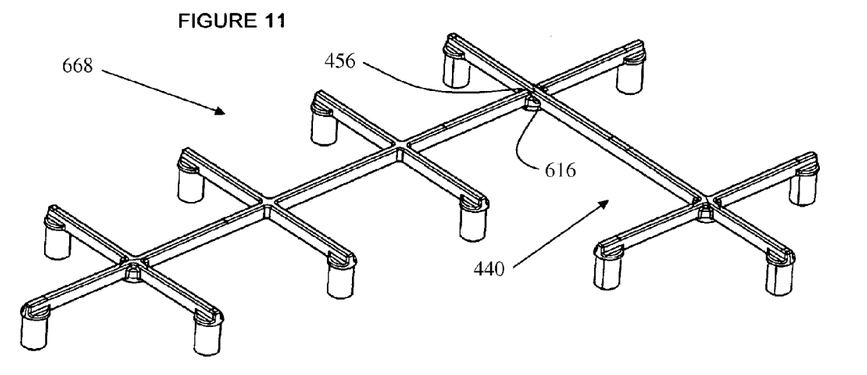
FIG. 11 shows an isometric view of an assembly of two modular trivet members.

FIG. 11 illustrates an assembly of a first modular trivet member 668 similar to that shown in FIG. 6, with a second trivet member 440 similar to trivet member 440 shown in FIG. 4. The slot 456 of member 440 overlies and is engaged with the reinforced slot 616 of member 668. That is, the reinforced slot 616 can support the weight applied to the junction of the members 440, 668.

Figure 12:
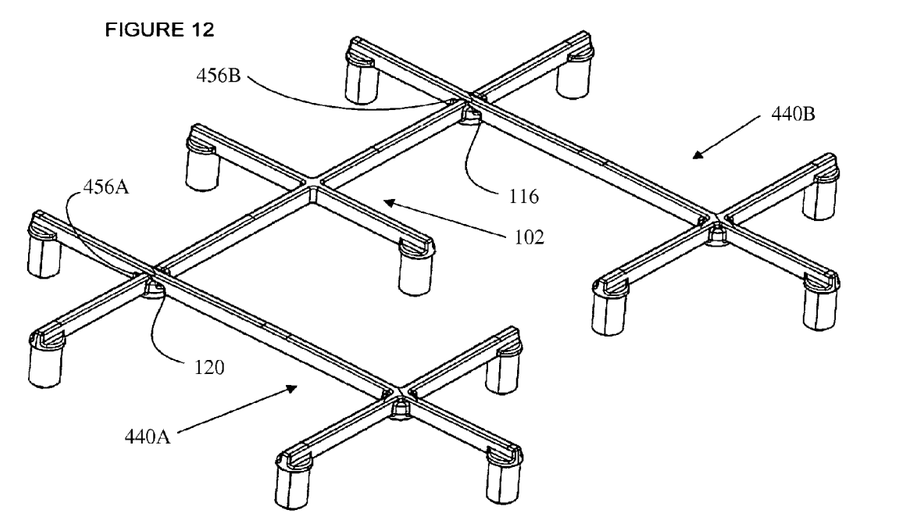
FIG. 12 shows an isometric view of an assembly of three modular trivet members.

FIG. 12 shows a trivet assembly including a pair of modular trivet members 440A, 440B similar to trivet member 440 shown in FIG. 4, and a modular trivet member 102 similar to the trivet member 102 shown in FIG. 2. Member 102 has a pair of reinforced slots 116, 120 which engage slots 456A and 456B of members 440A and 440B respectively.

The trivet bars and footings can provide a color contrast. For example, the bars can be black and the footings can be silver or light grey.

The bars are preferably solid, but channel section bars are within the scope of the invention.

In this specification, terms indicating orientation or direction, such as "up", "down", "vertical", "horizontal", "left", "right" "upright", "transverse" etc. are not intended to be absolute terms unless the context requires or indicates otherwise.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. A modular trivet member for a stove including a first bar, a first footing at a first end of the first bar, a second footing at a second end of the first bar, and one or more transverse bars, each transverse bar being transverse to the first bar and intersecting therewith, a second bar, wherein the second bar is one of the one or more transverse bars, and the second bar has a third footing at a first end of the second bar and a fourth footing at a second end of the second bar, wherein the first bar includes one or more upwardly facing transverse slots adapted to receive a cross member of a second modular trivet member, wherein the first bar includes a reinforcing block through which one of the one or more transverse slots passes, wherein each end of the first and second bars includes a threaded projection, and each footing includes a foot pad that can be adjusted in height by adjusting a screw cooperating with one of the threaded projections.

2. A trivet member as claimed in claim 1, wherein the footings are positioned at a height to support the first and second bars at a predetermined height above a bottom surface of at least one footing.

3. A trivet member as claimed in claim 1, wherein the first and second bars are formed integrally.

4. A trivet member as claimed in claim 1, wherein the transverse slot opens on an upper side of the first bar.

5. A trivet member as claimed in claim 1, wherein the slot opens on a lower side of the first bar.

6. A trivet member as claimed in claim 1, wherein the footings are tubular.

7. A trivet member as claimed in claim 6, wherein any of the ends of any of the bars include a projecting rim extending beyond a periphery of the respective tubular footing.

8. A trivet member as claimed in claim 1, wherein the footings are of a contrasting color to the first bar and the one or more transverse bars.

9. A first modular trivet member for a stove including
a first bar;
a first footing at a first end of the first bar;
a second footing at a second end of the first bar;
one or more transverse bars, each transverse bar being transverse to the first bar and intersecting therewith, and
a second bar, wherein the second bar is one of the one or more transverse bars, wherein the second bar has a third footing at a first end of the second bar and a fourth footing at a second end of the second bar, wherein each end of the first and second bars includes a threaded projection, and each footing includes a foot pad that can be adjusted in height by adjusting a screw cooperating with one of the threaded projections,
wherein the first modular trivet member is configured to be self-supporting, and
wherein the first bar includes a reinforcing block through which a transverse slot passes, the transverse slot adapted to receive a second, self-supporting modular trivet member, wherein the second, self-supporting modular trivet member includes one or more bars having a transverse slot configured to correspond with the transverse slot of the first bar, wherein at least one of the one or more bars of the second, self-supporting modular trivet member is removably connected to the first bar of the first modular trivet member such that the first bar and the at least one of the one or more bars of the second, self-supporting modular trivet member are transverse to one another, wherein the transverse slot of the first bar and the transverse slot of the at least one of the one of more bars of the second, self-supporting modular trivet member provide nesting structure such that the first modular trivet member and the second, self-supporting modular trivet member are removably connected to one another.

10. A trivet member as claimed in claim 9, wherein the transverse slot of the first bar opens on an upper side of the first bar.

11. A trivet member as claimed in claim 9, wherein the transverse slot of the first bar opens on a lower side of the first bar.

* * * * *

UNITED STATES PATENT AND TRADEMARK OFFICE
CERTIFICATE OF CORRECTION

PATENT NO. : 8,701,651 B2
APPLICATION NO. : 12/935999
DATED : April 22, 2014
INVENTOR(S) : King et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 497 days.

Signed and Sealed this

Twenty-ninth Day of September, 2015

Michelle K. Lee
*Director of the United States Patent and Trademark Office*